Dec. 23, 1969   R. J. BLANCHETTE   3,484,882
STRUCTURAL BEARING PAD ASSEMBLY
Filed Oct. 2, 1967

INVENTOR.
ROBERT J. BLANCHETTE

BY Gregg & Stidham
ATTORNEYS

United States Patent Office 3,484,882
Patented Dec. 23, 1969

3,484,882
STRUCTURAL BEARING PAD ASSEMBLY
Robert J. Blanchette, San Francisco, Calif., assignor to Structural Bearing Co., a partnership
Filed Oct. 2, 1967, Ser. No. 672,080
Int. Cl. E01d 19/04
U.S. Cl. 14—16           9 Claims

ABSTRACT OF THE DISCLOSURE

A structural bearing pad assembly for accommodating expansion and contraction as well as oscillatory movement of a structural beam relative to a supporting base or column. A pad of low friction material such as a filled polytetrafluoroethylene is secured to one base plate of steel or the like, and a composite pad of low friction material bonded to a resilient, load resistant material is bonded to another base plate. Each base plate is secured to one of the structural members as by welding in the case of a steel member or embedding it in a concrete member.

DESCRIPTION

This invention relates to a structural bearing pad assembly and, more particularly, a structural bearing pad assembly having physical characteristics that adapt it particularly to accommodate relative movement between two structural members along various axis.

It is highly desirable to provide bearing members between structure members as, for example, between a beam and column or supporting abutment in order to accommodate longitudinal movements of the beam as during expansion and contraction as well as rotational movement under beam loading. However, bearing members provided to date have not proven satisfactory for all purposes. Commonly, such bearing members are simply metallic plates such as steel, bronze or lead, but such plates cannot, of course, accommodate rotation of the beam, i.e. compressive movements along the axis of the column, unless they are milled into a rocker configuration. Moreover, because such metals do not have a low coefficient of friction in absence of lubrication, the plates are not particularly efficient in accommodation of longitudinal beam movements. This limitation of present bearing members to accommodate longitudinal movement by reason of high coefficients of friction obviously restricts the length of the beams that may be employed, particularly where the beams are subjected to wide temperature ranges that would produce extensive thermal expansion and contraction over a long beam. Of course, lubrication greatly increases the cost of maintenance, and even where permanently lubricated as in the case of some lubricated bronze bearing plates, the initial cost is quite high. Again, such metallic plates must be milled into a rocker configuration in order to accommodate beam rotation, and this further increases the cost. An additional disadvantage in the use of metallic bed plates resides in the fact that they are not chemically inert and in many installations such as bridges or the like, this may be a factor of considerable importance.

Another material that has been used for bearing pads is neoprene, but it is unable to take high loads in compression, and in order to provide for expansion or contraction the thickness must be built up to an undesirable amount. Moreover, neoprene is not suitable for use in low temperature environments and is subject to crystallization under such conditions.

It is, therefore, an object of this invention to provide a structural bearing pad assembly that will accommodate expansion and contraction of the beam, even under high compression loading.

It is a further object of this invention to provide a structural bearing pad assembly for a beam that will permit movement of the beam in all directions of the plane of the bearing surfaces to accommodate lateral sliding during placement as well as expansion and compression.

It is a further object of this invention to provide a structural bearing pad assembly that will accommodate a lengthy beam subjected to considerable total expansion and contraction.

It is a further object of this invention to provide a bearing pad assembly of materials that can withstand a wide range fo temperatures and which is chemically inert.

It is a further object of this invention to provide a bearing pad assembly for structural members which will accommodate movement in a plane of their supporting surfaces and in an axis transverse thereto.

In carrying out this invention, I provide a bearing pad assembly made up of essentially two components, each on a base of steel or the like. On one steel base I bond a pad of polytetrafluoroethylene (hereinafter called Teflon) and on the other steel base I bond an inert layer of a urethane polymer on which, in turn, is bonded another pad of Teflon. The base members are secured to the structural members as by welding in the case of a steel member, or simply embedding it, in the case of a concrete member, with the pads in face to face engagement, preferably with the poly-urethane backed pad on the bottom. The coefficient of friction of Teflon against Teflon is extremely low and will readily accommodate expansion and contraction in all directions of their engaging planes unless restrained by some other means such as an anchor bolt. Rotation of the beam is readily accommodated by the poly-urethane elastomer which is capable of withstanding extreme loads in compression.

Other objects and advantages of this invention will become apparent from the description following when read in conjunction with the accompanying drawing wherein.

Figure 1:
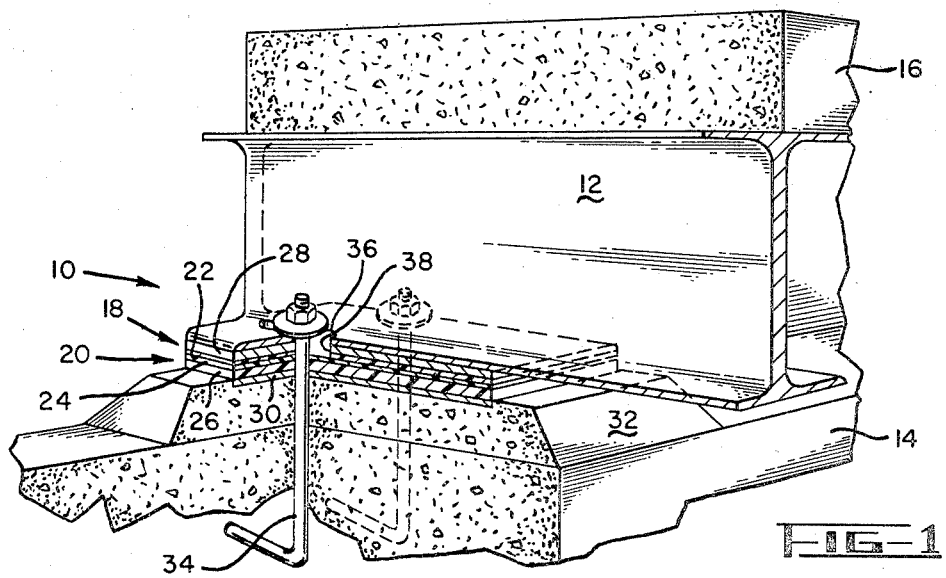
FIG. 1 is an isometric view partially in section of a steel beam and concrete abutment with the bearing pad of my invention interposed between them.

Referring now to the drawings with greater particularity FIG. 1 illustrates a typical beam support arrangement 10 in a bridge and includes a steel girder 12 which is supported on a concrete abutment 14 and in turn supports a road bed 16 of concrete or the like. While the girder shown is an I-beam, it will become apparent that my invention may be employed with many other forms of structural members.

The bearing pad assembly comprises a top bearing member 18 and a bottom bearing member 20 which have slidably engaging pads 22 and 24 of low friction material. For this purpose, I have found polytetrafluoroethylene, i.e. Teflon to be highly desirable, since the coefficient of friction for Teflon to Teflon is extremely low, well under 0.10, with steel to steel being in the range of 0.75. More particularly, I prefer a filled polytetrafluoroethylene comprising a mixture of Teflon and some material such as Fiberglass, graphite or metal in order to increase the loading characteristics and the wear-resistance of the Teflon. However, for low load installations pure polytetrafluoroethylene may be employed. On one of the pad assembly components, here shown on the bottom pad 20, I interpose an underlayer 26 of a resilient material to absorb rotation of the beam. For this purpose, I have found urethane polymers having a hardness range of 60–95 durometers Shore A to be particularly effective because of their extremely high load capacity and because they are relatively inert. The thickness of the urethane underlayer should be restricted, preferably in the range of ¼ to ½ inch in order to maximize the shape factor. Of course, the invention is not restricted to a particular range of thicknesses, but a limitation here is desirable in order to minimize the deflection of the urethane under compression. The shape factor is defined as the ratio of the loaded area to the bulge area, and is desirably kept as large as possible. Just by way of example, in a bearing pad assembly 6 inches square with an underlayer of 80 durometer Shore A urethane elastomer ½ inch thick, it may be determined as follows:

$$\frac{\text{loaded area}}{\text{bulge area}} = \frac{6 \times 6}{4 \times 1/2 \times 6}$$

$$= \frac{36}{12} = 3$$

Tests have shown that under a load in compression of 2,000 p.s.i. such a urethane pad having a shape factor of 3 will deflect less than 12% or, in this case, less than 0.06 inch.

Both the top and bottom bearing pad components are carried on bases 28 and 30 of steel plate as by bonding. In the assembly shown in FIG. 1, the steel sole plate 28 for the upper component is welded to the undersurface of the steel girder 12 and the steel bed plate for the lower component is embedded in a grout pad 32. As will be pointed out hereinafter, the bed plate may simply be placed in the form of a concrete structure member to be poured but, in the case of a pre-existing concrete member it will suffice simply to form a grout pad and embed the bed plate 30 into it. In the case of a pre-existing structure such as illustrated in FIG. 1, the steel girder 12 is lifted above the abutment 14 by any suitable means such as hydraulic jack (not shown) and, after the grout pad 32 is poured, the lower component is lowered over the anchor bolt 34 and the grout pad 32 is allowed to set. The upper assembly 18 is welded to the undersurface of the steel girder 12 and after the grout pad has cured sufficiently, the girder is lowered so that the Teflon pads 22 and 24 of the components are in engagement and the nut is replaced onto the anchor bolt.

It might be noted that the I-beam girder 12 is slotted at 36 to allow expansion and contraction along the anchor bolt 34 and, since the upper bearing component 18 moves with the I-beam, it is also slotted at 38 coextensive with the slot 36.

For preparing the lower component bearing pad 20, a preformed Teflon pad 24 of the desired size and configuration, e.g., a 6 inch by 6 inch square may be placed in a mold of the same dimensions and the polyurethane is poured on top of it to the desired thickness, preferably, though not necessarily after adding bonding agents. Then the steel bed plate 30 is placed on top of the polyurethane 26, again after adding bonding agents, and the polyurethane is allowed to cure as by heating it for two hours at a temperature of 250° F. In preparing the upper component the Teflon pad 22 is bonded to the steel sole plate 28 as by means of a high temperature resistant epoxy where the sole plate is subsequently to be welded.

Figure 2:
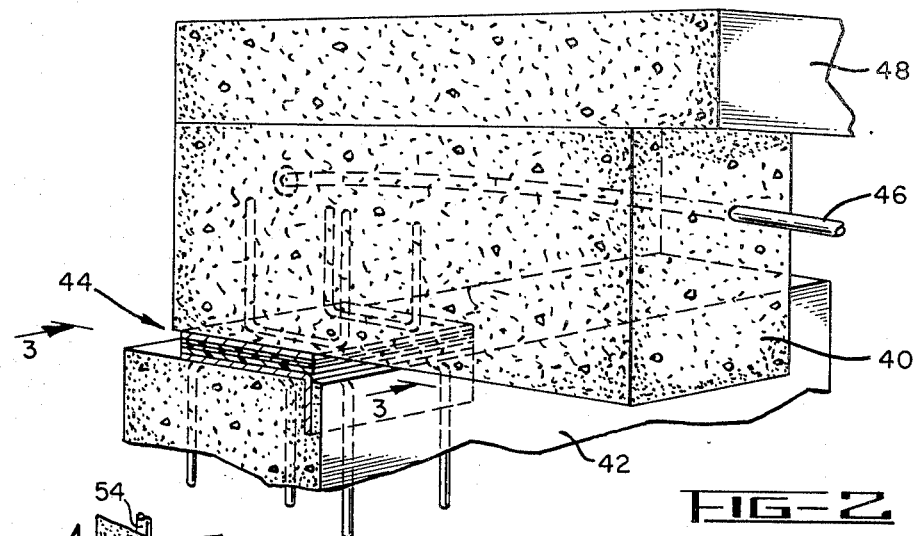
FIG. 2 is a similar view of a concrete beam and supporting abutment.
Figure 3:
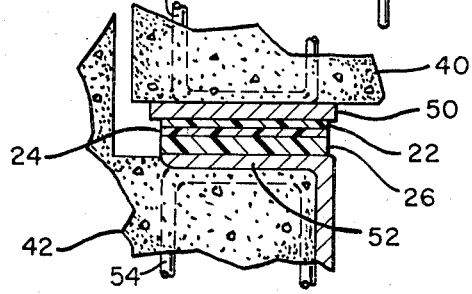
FIG. 3 is a section view taken along line 3—3 of FIG. 2.

Referring now to FIG. 2, I have illustrated an application of my invention for newly constructed concrete structural members. As shown there, a concrete beam 40 is supported on a concrete abutment 42 with one of my bearing pad assemblies interposed between them. The concrete girder 40 may contain reinforcing rods or cables 46 for poured in place post-tensioned or precast prestressed concrete which supports the road bed 48. Hence, the bearing pad assembly 44 must accommodate some longitudinal contraction, even during construction. As shown in FIGS. 2 and 3, the structure of the upper and lower components are essentially the same as that shown in FIG. 1 with one particular exception that specifically adapts the assembly for use in newly formed concrete structures. On the upper side of the sole plate 50 in the top component and on the underside of the bed plate 52 in the lower component I weld one or more reinforcing bars 54 which are bent into a generally U-shaped configuration. Hence, the reinforcing bars are firmly fixed to the steel bases of the components and to the concrete member to which they are to be fixed. This welding of the reinforcing members is preferably done before the plates are secured to the Teflon or laminated Teflon and urethane. Then, after the components are firmly bonded and cured, the building pad assemblies are taken to the job site and simply placed into the form before the abutment and girder are poured.

When the girder 40 is in place, the Teflon pads function to accommodate longitudinal expansion and contraction of the beam. However, it should also be noted that the Teflon pads can accommodate relative movement in any direction in the plane of the engaging faces and are, therefore, useful in placement of the beam wherein some relative transverse movement may be required.

While this invention has been described in conjunction with preferred embodiments thereof, it is obvious that modifications and changes therein may be made by those skilled in the art without departing from the spirit and scope of this invention as defined by the claims appended hereto.

Having described my invention, I claim:

1. A structural bearing assembly to accommodate relative movement between a structural member and a support for the structural member along at least two axes comprising:

first and second pads, one of said first and second pads being secured to said structural member and the other of said first and second pads being secured to said support for the structural member, said first pad comprising a layer of semi-rigid, chemically inert material having a low coefficient of friction, and said second pad comprising a complementary layer of said semi-rigid material and an underlayer of a resilient polymer comprising urethane in the hardness range of 60 to 95 durometers on the Shore A scale, said complementary layers being of tetrafluoroethylene and disposed in face to face engagement along one of said axes.

2. The structural bearing defined in claim 1 including first and second metallic mounting bases, the complementary layer of said first pad being bonded to said first mounting base, and the underlayer of said second pad being bonded to said second mounting base.

3. The structural bearing defined in claim 2 wherein: said underlayer does not exceed one half inch in thickness.

4. The structural bearing defined in claim 2 including: a reinforcing member for concrete welded to at least one of said mounting bases.

5. The structural bearing defined in claim 4 wherein: said reinforcing member is bent into a generally U-shaped configuration with the base thereof welded to said mounting base.

6. The structural bearing defined by claim 2 wherein: at least one of said mounting bases is directly welded to the structural member.

7. The structural bearing defined by claim 1 wherein: said urethane underlayer is molded directly to said complementary layer of said second pad.

8. A structural bearing assembly to accommodate relative movement between a steel structural member and a concrete support for the steel structural member comprising:

first and second relatively movable bearing pads, said first pad comprising a first metallic mounting base and a first layer of semi-rigid, chemically inert material comprising tetrafluoroethylene secured to said first mounting base, said second pad comprising a second metallic mounting base, a second layer of semi-rigid, chemically inert, material comprising tetrafluoroethylene, and an underlayer of a resilient polymer comprising urethane in the hardness range of 60 to 95 durometers on the Shore A scale secured intermediate said second metallic mounting base and said second layer of semi-rigid material, said first and second layers of semi-rigid material being in sliding contact with one another, said first mounting base being welded to the steel structural member, and a reinforcing member welded to the second mounting base and embedded in the concrete support for the steel structural member.

9. The structural bearing assembly defined in claim 8 wherein:

said underlayer is secured by molding the same directly onto said second layer of semi-rigid material.

References Cited

UNITED STATES PATENTS

| | | | |
|---|---|---|---|
| 3,243,236 | 3/1966 | Graham | 14—16 XR |
| 3,301,609 | 1/1967 | Palfreyman | 14—16 XR |
| 3,349,418 | 10/1967 | Hein | 14—16 |

JACOB L. NACKENOFF, Primary Examiner

U.S. Cl. X.R.

308—3